US008639032B1

(12) United States Patent
Voorhees et al.

(10) Patent No.: US 8,639,032 B1
(45) Date of Patent: Jan. 28, 2014

(54) WHITEBOARD ARCHIVING AND PRESENTATION METHOD

(75) Inventors: Garald Lee Voorhees, Tampa, FL (US); Robert Anders Steinberger, Palm Harbor, FL (US); Ralph Ernest Ocampo, Palm Harbor, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 1213 days.

(21) Appl. No.: 12/201,367

(22) Filed: Aug. 29, 2008

(51) Int. Cl.
| | |
|---|---|
| *G06K 9/00* | (2006.01) |
| *G06K 9/34* | (2006.01) |
| *G06K 9/36* | (2006.01) |
| *G06K 9/54* | (2006.01) |
| *G06K 9/60* | (2006.01) |
| *H04N 7/18* | (2006.01) |
| *H04N 9/475* | (2006.01) |
| *G06F 3/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |
| *G06F 17/00* | (2006.01) |

(52) U.S. Cl.
USPC ........... 382/176; 382/100; 382/162; 382/187; 382/292; 382/305; 348/143; 348/512; 715/231; 715/254; 715/751

(58) Field of Classification Search
USPC ................. 345/418, 581, 660–661, 666, 689; 348/61–63, 143, 222.1, 240.99–240.3, 348/500, 512, 515; 725/32
See application file for complete search history.

(56) References Cited

U.S. PATENT DOCUMENTS

| | | | |
|---|---|---|---|
| 6,452,615 B1 * | 9/2002 | Chiu et al. ..................... | 715/776 |
| 6,490,322 B2 | 12/2002 | Needham et al. | |
| 6,646,655 B1 * | 11/2003 | Brandt et al. ................. | 715/723 |
| 7,224,847 B2 | 5/2007 | Zhang et al. | |
| 7,647,555 B1 * | 1/2010 | Wilcox et al. ................. | 715/721 |
| 2002/0036694 A1 * | 3/2002 | Merril ........................... | 348/220 |
| 2002/0054026 A1 * | 5/2002 | Stevenson et al. ............ | 345/173 |

(Continued)

OTHER PUBLICATIONS

International Preliminary Report on Patentability for International Patent Application No. PCT/US2009/055351 dated Mar. 1, 2011.

*Primary Examiner* — Randolph I Chu
*Assistant Examiner* — Nathan Bloom
(74) *Attorney, Agent, or Firm* — Anton J. Hopen; Smith & Hopen, P.A.

(57) ABSTRACT

The present invention discloses methods of archiving and optimizing lectures, presentations and other captured video for playback, particularly for blind and low vision individuals. A digital imaging device captures a preselected field of view that is subject to periodic change such as a whiteboard in a classroom. A sequence of frames is captured. Frames associated with additions or erasures to the whiteboard are identified. The Cartesian coordinates of the regions of these alterations within the frame are identified. When the presentation is played back, the regions that are altered are enlarged or masked to assist the low vision user. In another embodiment of the invention, the timing of the alterations segments the recorded audio into chapters so that the blind user can skip forward and backward to different sections of the presentation.

13 Claims, 18 Drawing Sheets

(56) References Cited

U.S. PATENT DOCUMENTS

| | | |
|---|---|---|
| 2004/0095376 A1* | 5/2004 | Graham et al. .............. 345/716 |
| 2004/0175035 A1 | 9/2004 | Kameyama |
| 2004/0205477 A1 | 10/2004 | Lin |
| 2005/0078868 A1 | 4/2005 | Chen et al. |
| 2005/0201619 A1* | 9/2005 | Sun et al. ..................... 382/176 |
| 2007/0230749 A1 | 10/2007 | Foss |
| 2007/0269105 A1* | 11/2007 | Zhang et al. .................. 382/165 |
| 2008/0079693 A1* | 4/2008 | Okamoto et al. ............. 345/157 |
| 2008/0114844 A1* | 5/2008 | Sanchez et al. ............... 709/206 |
| 2008/0235276 A1* | 9/2008 | Erol et al. .................. 707/104.1 |
| 2008/0276159 A1* | 11/2008 | Narayanaswami et al. ... 715/202 |

\* cited by examiner

*Obviousness*

*KSR Int'l Co. v. Teleflex Inc
(key points)
a)....
b).....*

*PHE*

*U. of Texas v. BENQ
(key points)
a)....
b).....*

WHITEBOARD ARCHIVING AND PRESENTATION METHOD

FIELD OF INVENTION

This invention relates to methods of archiving and optimizing lectures, presentations and other captured video for playback, particularly for blind and low vision individuals.

BACKGROUND OF THE INVENTION

A long-felt problem has existed in the art to archive presentations, particularly those utilizing blackboard and whiteboards. Electronic whiteboards have the ability to scan the writing on them and transfer them to computers. However, such whiteboards are expensive, of limited size and substantially non-portable.

An alternative to electronic whiteboards is to video capture the presentation. A drawback to this approach is that the speaker in the foreground inherently obscures portions of the whiteboard during playback. A proposed solution to this problem is enumerated in U.S. Pat. No. 7,224,847 to Zhang et al. entitled System and Method for Real-Time Whiteboard Streaming which is incorporated herein by reference. The '847 reference describes video capture of the whiteboard presentation and methods to filter out the speaker from the whiteboard. However, the '847 reference does not describe a solution to archive these presentations in a manner that facilitates playback of sub-topics within the lecture. Nor does it describe methods to playback the presentation for the low-vision or blind user.

SUMMARY OF INVENTION

An embodiment of the present invention includes a computer-implemented process comprising the steps of setting a digital imaging device to capture a preselected field of view, the field of view having a background subject to periodic change, capturing a sequence of frames with the digital imaging device according to a preselected interval, identifying frames containing alterations in the background, identifying the regions of the alterations within the identified frames, and displaying the regions of background alterations. It should be noted that the present invention is not limited to simply output the entire frame associated with an alteration on a background, but rather the specific region that was altered.

The step of identifying the frame containing alterations can be performed as a function of time. For high-performance applications, detection of modifications in the background image may take place in real-time (i.e., 30 frames per second) wherein the fluid movements of the marks on a whiteboard may be identified and outputted back to an end user. Additionally, an embodiment of the invention may presume that images are inscribed at intervals. For example, writing a quote from a literature reference in a time span of 10 seconds then lecturing about the quote for a period of 5 minutes. The present invention detects a substantially continuous change in the background for a period of 10 seconds. After 10 seconds no new alterations are detected. Accordingly, the Cartesian coordinates of the change are defined by alteration made during the 10 second interval. The 5 minutes of lecture audio that is recorded subsequent to the 10 second alteration is presumed to be related.

In an embodiment of the invention, it is anticipated that users may modify, append and delete content archived by the process. During real-time recording or, alternatively during playback, end users may execute commands to archive additional frames or "snapshots" of the field of view. In addition, end users may annotate and layer the frames with elements including, but not limited to, lines, masking, shapes, handwriting and predefined overlays. Users may set transparency values for each layer and elements may be toggled on and off during playback by end-user command.

End user modification may include extracting a portion of a frame ("cropping") to remove unwanted information. The user may create additional frames from the original as the timeline progresses or restore the original for a new section of the timeline. The video capture device may record full or partial motion video which may be displayed in conjunction with the frames and regions of alteration.

End users may record audio as part of the timeline. During review, end users may adjust properties such as speed, volume and pitch. An algorithm in the software process maintains voice quality even when the speed of playback is modified.

Outside sources such as television, video, radio and Internet activity can be recorded as part of the timeline. During review, these elements may be compressed in the same manner as other elements. End users may add notes to the timeline. These notes may appear in a separate window during review. These notes may be modified and/or consolidated into output.

Users may manually segment the presentation into chapters during real time capture and/or during playback. Chapter segments may be named by the end user and added, modified or removed during review.

By compressing the timeline, the user makes reviewing notes in the future more efficient. Individual elements can be hidden or removed from segments or from the whole of the timeline. Additionally, entire segments of the timeline can be suppressed or removed from playback.

End users may insert complete or portions of other recorded timelines into the timeline they are reviewing. These insertions can be applied to the beginning or end of the recording. Alternatively, they can be added at a specific place within the current timeline. Insertions become part of the current timeline.

Users may insert white space into individual or all elements of the timeline. When white space is inserted into individual elements of the timeline, that element will not be shown during that portion of playback. When white space is added to all elements, the timeline is pushed out creating in essence a pause for thought in the playback.

End users may export selected sections of their timeline to other formats such as Adobe Flash®, Microsoft PowerPoint®, Microsoft Silverlight®, HTML or the like.

Because the process is automated, it may be implemented in real-time and during playback.

The regions may be sequentially displayed as enlarged images. Alternatively or in conjunction with the enlargement, the regions may be bounded by an opaque mask or other alteration in appearance including, but not limited to, grayscale, hue, brightness, contrast, or transparency.

A timecode value is associated with the initiation of a new alteration within the identified frame. The alteration includes, but is not limited to additions, modification, erasures, slide sequences, and display of physical objects. The regions are displayed in a chronological order according to timecode values.

In an embodiment of the invention, the method includes the steps of establishing the relative position of a first region of background alteration to a second region of background alteration, sequentially displaying the first and second regions of background alteration according to the time code value, and applying a transition associated with the relative position of the second region of background alteration to the first region of background alteration. For example, a first mathematical formula is written on the left side of a whiteboard. The speaker discusses the first formula for a period of time. The speaker then writes a second formula on the right side of a whiteboard. Regions defined by the outer boundaries of each formula will be chronologically displayed to the end user. However, since the second formula was written to the right of the first formula, a video transition such as a "wipe" slides the second formula in from the right side of the display thereby "pushing" the first formula off the left side of the display. This transition application maintains the end user's spatial awareness of the whiteboard even though only regions of the whiteboard are enlarged.

In an embodiment of the invention, steps include establishing the relative position of a first region of background alteration to a second region of background alteration, displaying a scrollable canvas of the field of view, the display zoomed into a subsection of the field of view, and sequentially scrolling from the first region to the second region of background alteration according to the time code value. In this embodiment, the spatial integrity of all whiteboard markings is maintained. However, the method applies automated intelligence to scroll in the proper direction at the proper time. This is particularly useful when audio of the presentation is played simultaneously to the end user. End user control may be provided to manually scroll to different sections of the canvas. End users may also record annotations on the canvas and modify the timecode value of the alteration responsive to end-user input.

The method includes the step of filtering foreground movement from frames containing alterations in the background whereby objects in the foreground are eliminated from view. The foreground object would typically be the speaker or some other moving object that temporarily blocks the whiteboard.

A novel embodiment of the invention utilizes the detection of visual changes to segment audio. This is truly a counterintuitive method with respect to playback for the blind. The embodiment includes the steps of setting a digital imaging device to capture a preselected field of view, the field of view having a background subject to periodic change, capturing a sequence of frames with the digital imaging device according to a preselected interval, capturing audio in association with the sequence of frames, identifying frames containing alterations in the background, timecoding the captured frames and audio, and segmenting the captured audio into chapters defined by timecode values associated with the initiation and completion of alterations within the identified frames.

In yet another embodiment of the invention, the method includes the steps of setting a digital imaging device to capture a preselected field of view, the field of view having a background subject to periodic change, capturing a sequence of frames with the digital imaging device according to a preselected interval, capturing audio in association with the sequence of frames, identifying frames containing alterations in the background, generating thumbnail images of the identified frames, timecoding the captured frames and audio, segmenting the captured audio into chapters defined by timecode values associated with the initiation and completion of alterations within the identified frames, and generating a chapter menu comprising a plurality of thumbnail images whereby end-user selection of an individual thumbnail image initiates playback of an associated segment of audio and its corresponding frames by timecode values.

Generation of the chapter menu, analogous to a DVD menu, has substantial utility for both low-vision and normal vision users. A lengthy, multi-topic presentation may be automatically divided into distinct visual chapters. Access to specific content is thereby facilitated. In addition to displaying the entire frame, the thumbnails may be further refined by the steps of identifying the regions of the alterations within the identified frames, and generating the thumbnail images from the identified regions.

In an embodiment of the invention, a bounding box is superimposed over the regions of background alterations. A graphic filter is optionally applied to the area within the bounding box to provide greater visual contrast. The graphic filter may include a modification in brightness, contrast, hue, color saturation or the like. An advantage of superimposing the bounding box is that the region of background alteration is shown in the context of the overall field of view or some zoomed in view thereof.

In yet another embodiment of the invention, an edge detection algorithm is applied to resolve the Cartesian coordinates of a writing surface such as a white board, blackboard or projection screen. By defining these edges, a zoom setting is automatically provided for this region of possible alterations. In the case of a plurality of distinct writing surfaces (i.e., multiple whiteboards) a plurality of zoom settings are provided. Keyboard shortcuts, mouse events and the like may be used to cycle through these automatically generated zoom settings.

In yet another embodiment of the invention, predetermined indicia marked on a writing surface may be used to identify alterations. For example, a speaker using a whiteboard writes out substantive content using a blue marker. However, when the speaker changes to a red marker the hue is detected by the digital imaging device and it signals a change in discussion. A speaker may use printed characters within a predetermined geometric shape to set a chapter title under the current invention. The computer-implemented process recognizes the geometric shape and applies optical character recognition to the printed characters within the geometric shape.

Indicia may also be in the form of a predetermined geometric shape such as a vertical or horizontal line that is easily detected by an edge detection algorithm. An individual that is aware of the predetermined indicia may greatly facilitate the quality of the recording by utilizing indicia automatically detected by the computer-implemented process to signal regions of interest, changes in subject topic, and the like.

The present invention may be extended into an optical character recognition (OCR) application. With a structured document, the text flows in a predictable pattern (for English, left to right, top to bottom). This makes OCR of a typeset page manageable. However, in contradistinction a whiteboard lecture generates text markings in more random locations. Therefore, the standard OCR analysis (left to right, top to bottom) would product gibberish. However, text marked on a whiteboard does follow a time sequence. Thus, instead of capturing the entire unstructured whiteboard for OCR processing the present invention captures regions of background alterations at time intervals. Each region is processed by OCR and then ordered according to its timed sequence. Thus, it is possible to reconstruct a seemly random whiteboard presentation into a traditional typeset document structure.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
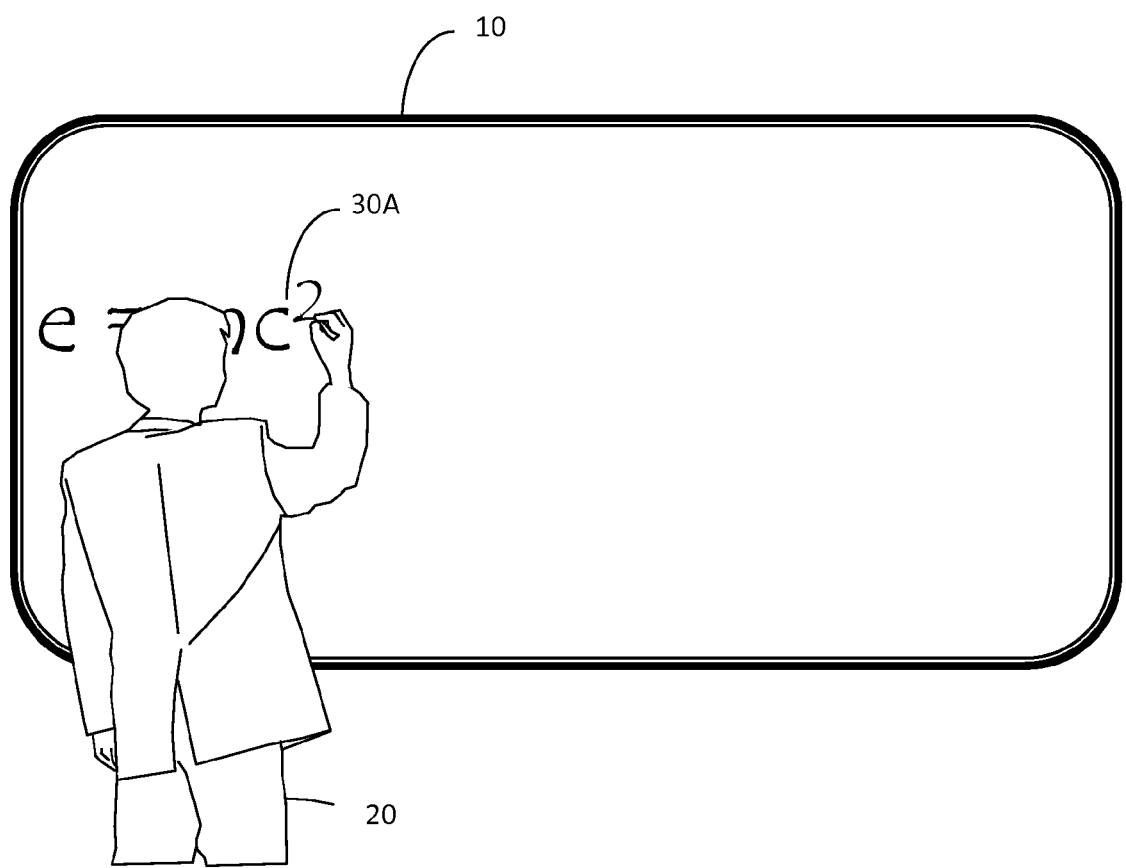
FIG. 1 is an illustration of a speaker writing a first formula on a whiteboard.

Turning now to FIG. 1 speaker 20 writes formula 30A on whiteboard 10. From this elevated view it can be seen that speaker 20 partially blocks formula 30A from view. A concept employed by the present invention is that formula 30A remains relatively static while speaker 20 moves around.

Figure 2:
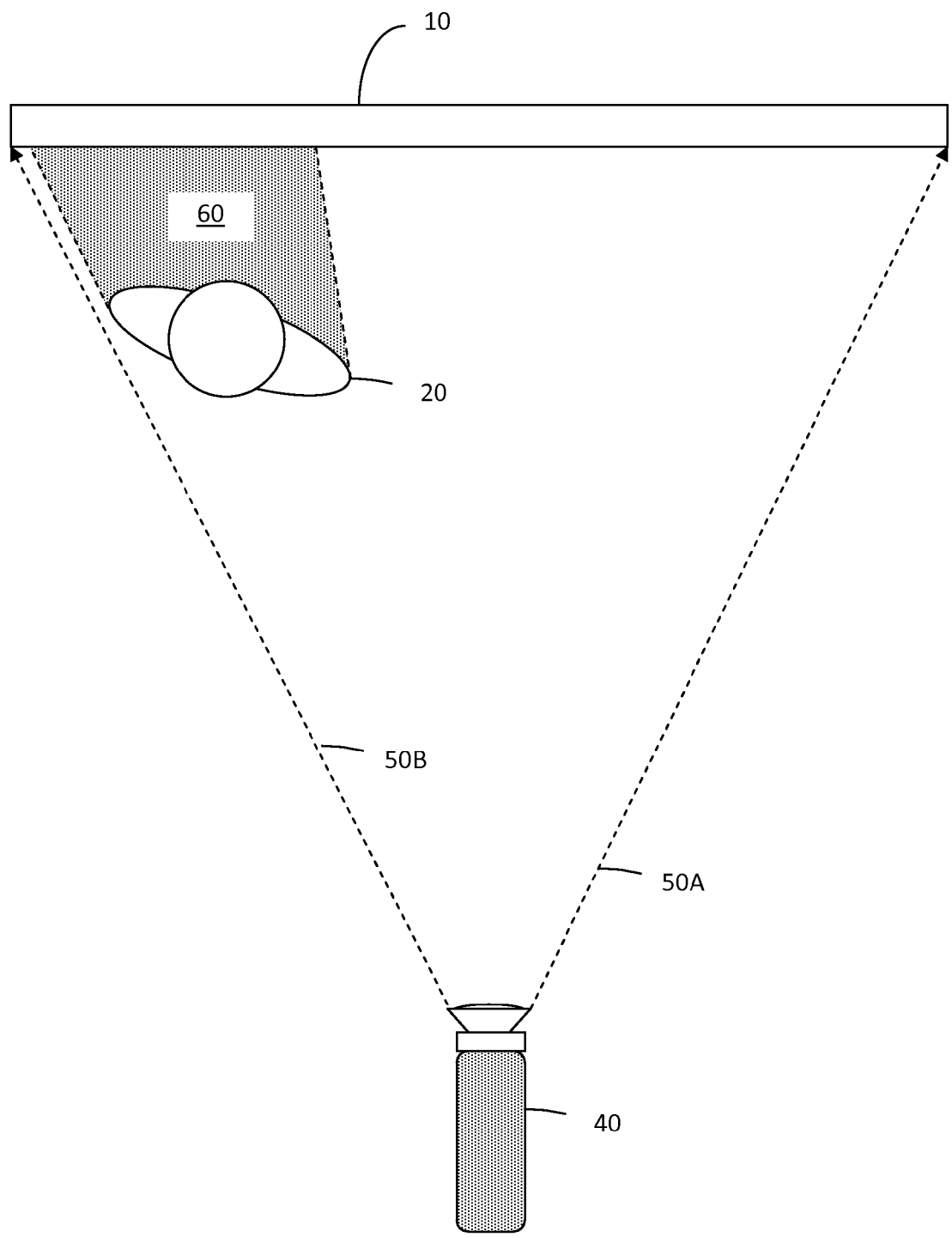
FIG. 2 is an, top-down illustration of the speaker blocking a portion of the whiteboard during video capture.
Figure 3:
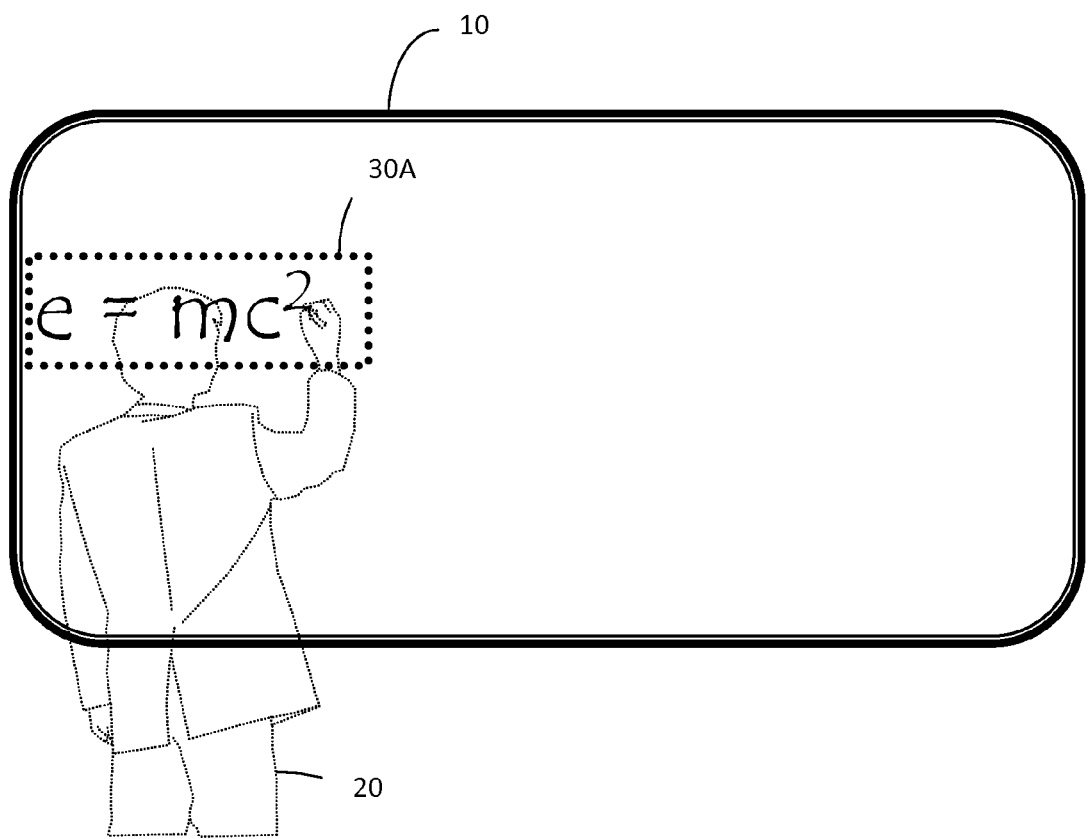
FIG. 3 is an illustration of the speaker electronically filtered from the field of view whereby the entire whiteboard is visible.

In FIG. 2, digital capture device 40 has a field of view defined by 50A-B which corresponds to the perimeter of whiteboard 10. Digital capture device 40 has sufficient resolution to capture background changes in the entire field of view. The necessarily resolution is determined by the size of the field of view and the level of detail required by an end user. Speaker 20 creates blackout area 60 over whiteboard 10. By image comparison of the substantially static whiteboard 10 markings to relatively dynamic speaker 20, speaker 20 may be electronically filtered as shown in FIG. 3. For example, while speaker 20 is inscribing a new formula on whiteboard 10, the present invention compares adjoining frames to see that speaker 20 in the foreground is still blocking a clear view of formula 30A. When speaker 20 no longer blocks the boundaries of formula 30A then the present invention fires an event to capture formula 30A without any obstructions in the view.

Figure 4:
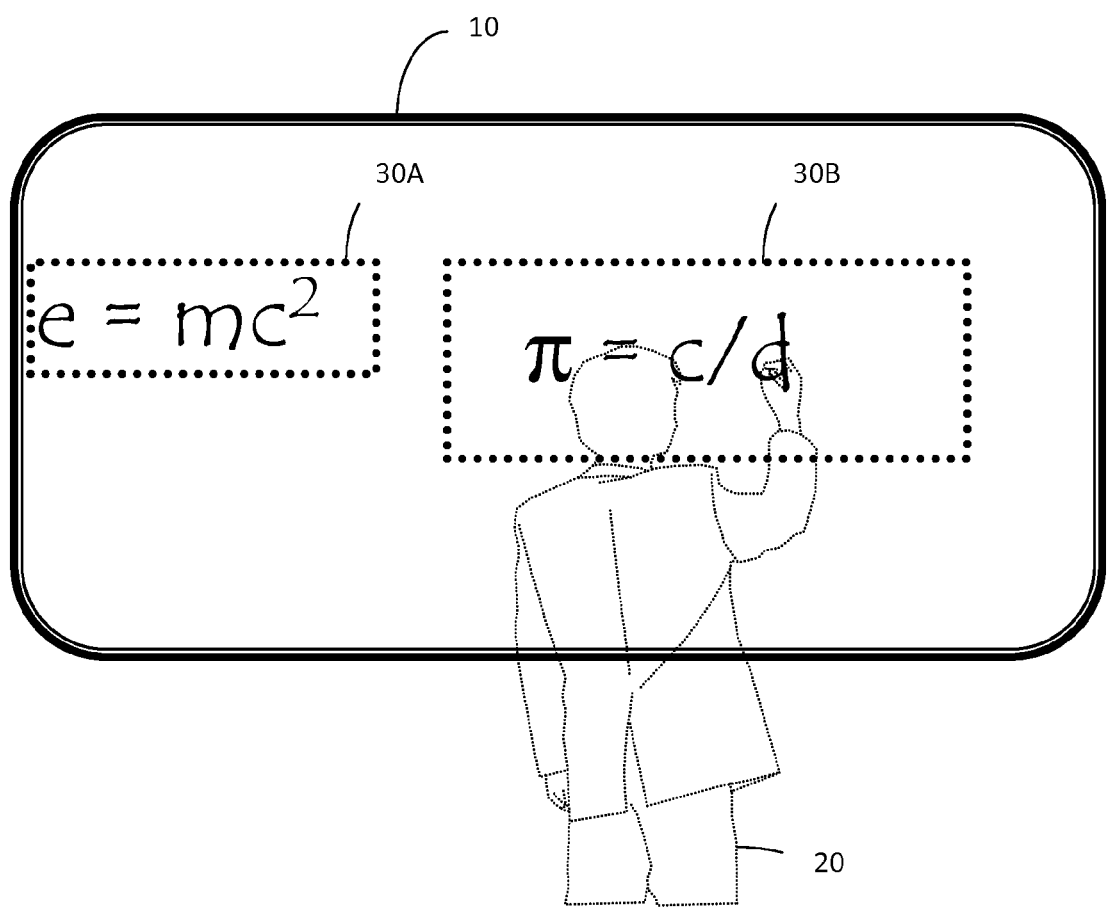
FIG. 4 is an illustration of the speaker writing a second formula on the whiteboard.

Concurrent with the detection and filter of speaker 20, the region of alteration defined by the boundaries of formula 30A is identified by its Cartesian coordinates. Upon completion of writing formula 30A, the current invention makes the assumption that a predetermined time period will elapse before the next set of writings are inscribed on whiteboard 10. This elapsed time permits one region to be distinguished from another. In FIG. 4, speaker 20 writes formula 30B to the right of formula 30A. Each formula, 30A and 30B, has its own region defined by its coordinates with respect to whiteboard 10.

Figure 5:
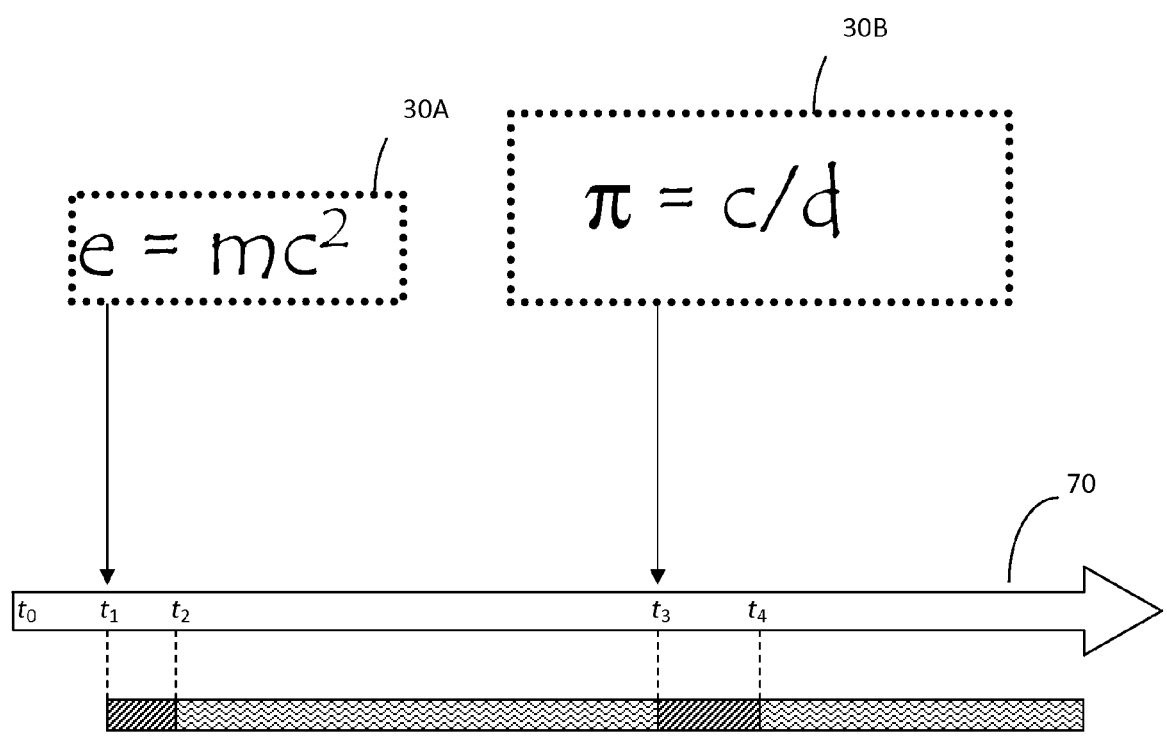
FIG. 5 is a diagrammatic view of a timeline showing the sequence of displaying the first formula and then, subsequently, the second formula according to timecode values.

In FIG. 5, timeline 70 illustrates that lecture started at $t_0$. At $t_1$ speaker 20 initiated writing formula 30A on whiteboard 10. At $t_2$ speaker 20 completed writing formula 30A on whiteboard 10. Between $t_2$ and $t_3$ it is presumed that speaker 20 discussed formula 30A as it was the last inscription made on whiteboard 10 and thus formula 30A is relative to the verbal communications made between $t_2$ and $t_3$. At $t_3$ speaker 20 initiated inscribing formula 30B and completed the inscription at $t_4$. From $t_3$ to the remainder of timeline 70 is it presumed that speaker 20 discussed formula 30B. Thus, the present invention establish a first chapter of the presentation at $t_1$ with respect to discussions of formula 30A and a second chapter of the presentation at $t_3$ with respect to discussion of formula 30B.

Figure 6:
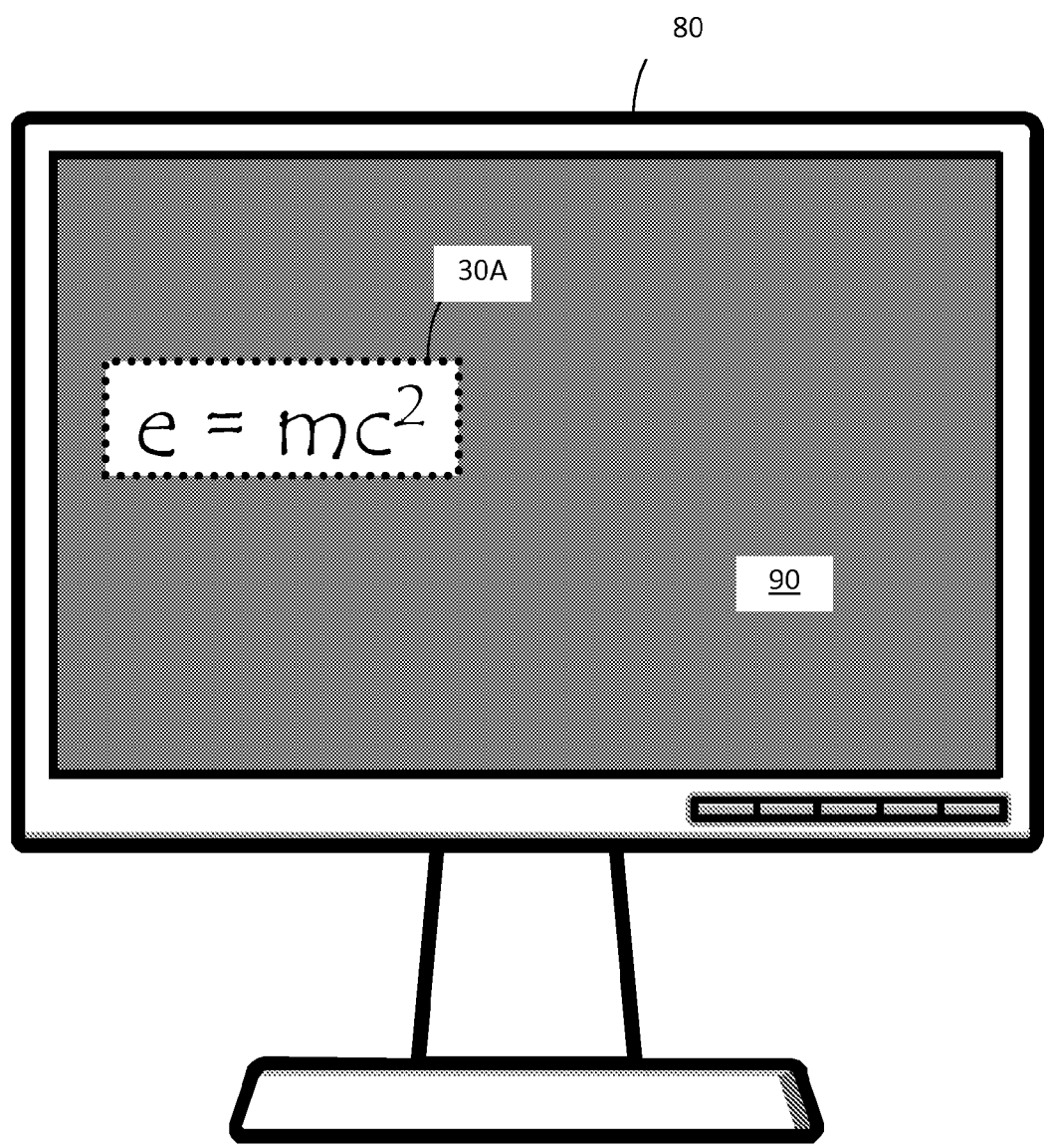
FIG. 6 is an illustration of a computer display showing the first formula bounded by an opaque mask.
Figure 7:
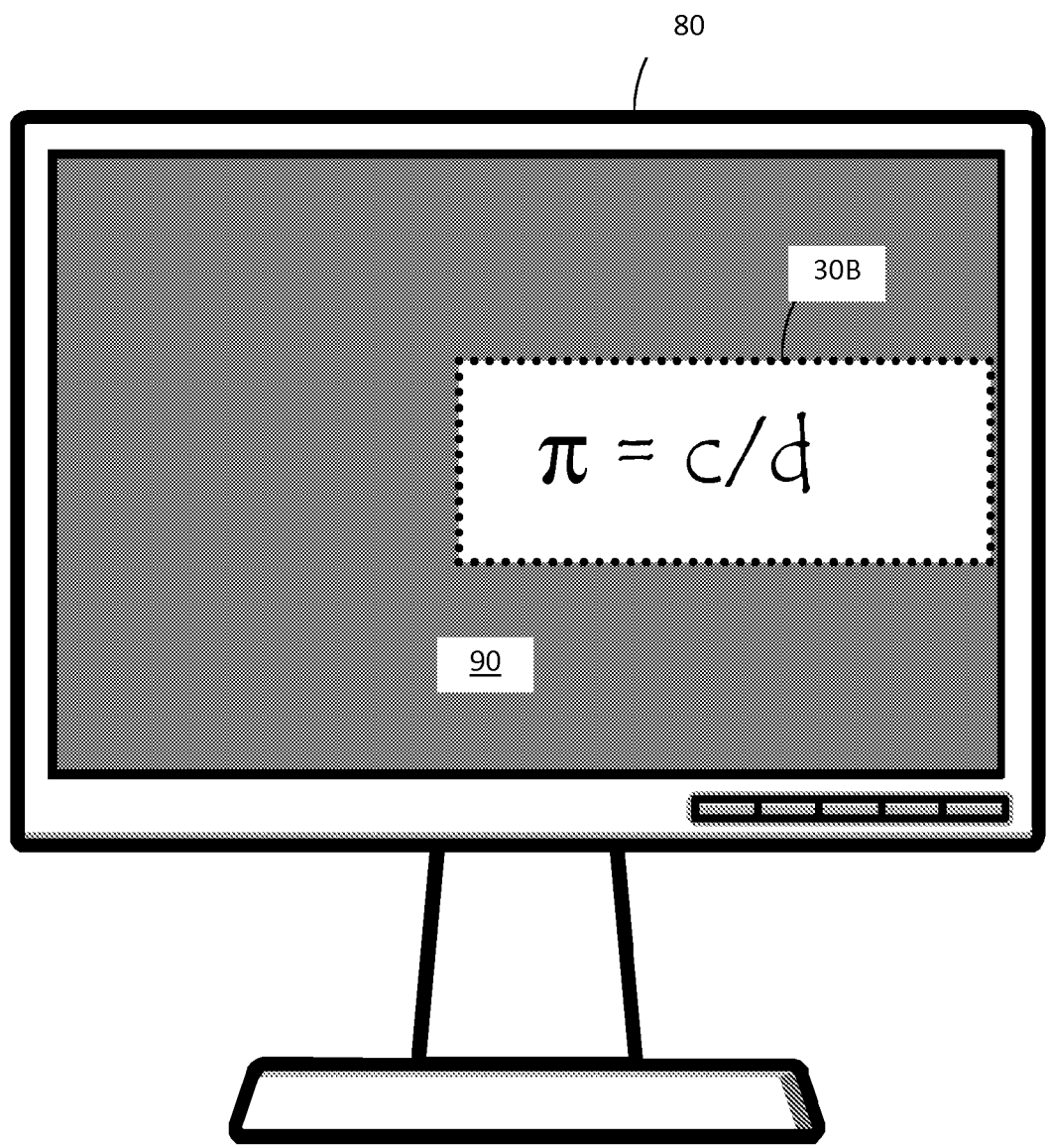
FIG. 7 is an illustration of a computer display showing the second formula bounded by an opaque mask.

FIG. 6 shows an embodiment of the invention illustrating playback of the presentation to an end user on computer monitor 80 wherein formula 30A is displayed bounded by an opaque mask on desktop 90. Opaque mask is defined by the Cartesian coordinates calculated from image analysis of the alterations of whiteboard 10 as a function of time. In FIG. 7, formula 30B is displayed bounded by an opaque mask on desktop 90. It should be noted that formula 30B would generally be displayed sequentially, after the presentation of formula 30A. It can be seen that formula 30A has been concealed by the opaque mask so that the end user can easily focus on formula 30B. This can be an important feature for low-vision users wherein visual clutter on display 90 makes it difficult to find relevant images.

Figure 8:
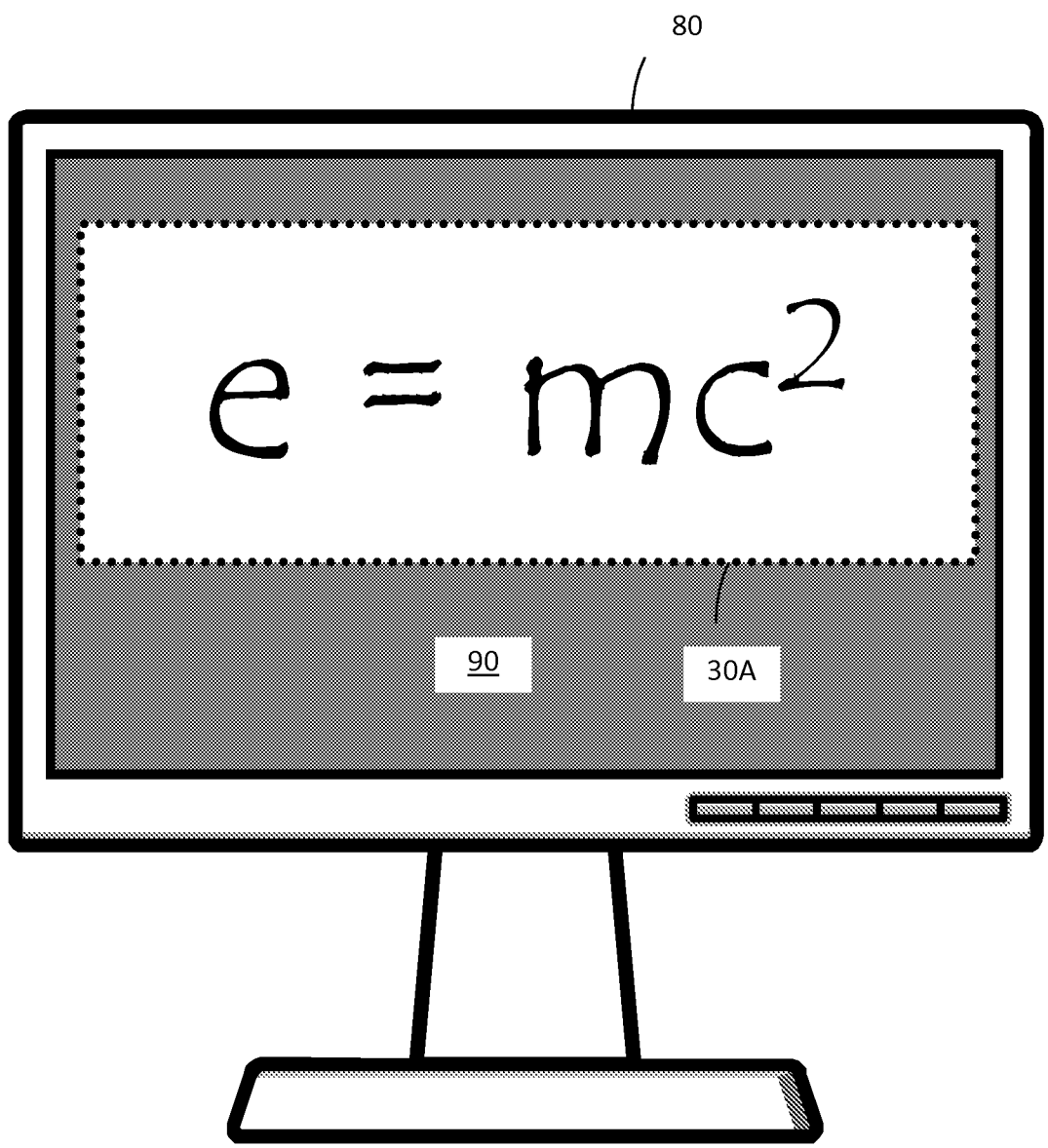
FIG. 8 is an illustration of a computer display showing the first formula enlarged and bounded by an opaque mask.

FIG. 8 shows an alternative embodiment of the invention wherein formula 30A is enlarged on desktop 90. The enlargement of formula 30A can be appreciated by both low-vision and normal-vision users at is reinforces the topic of the presentation contemporaneously with audio playback.

Figure 9:
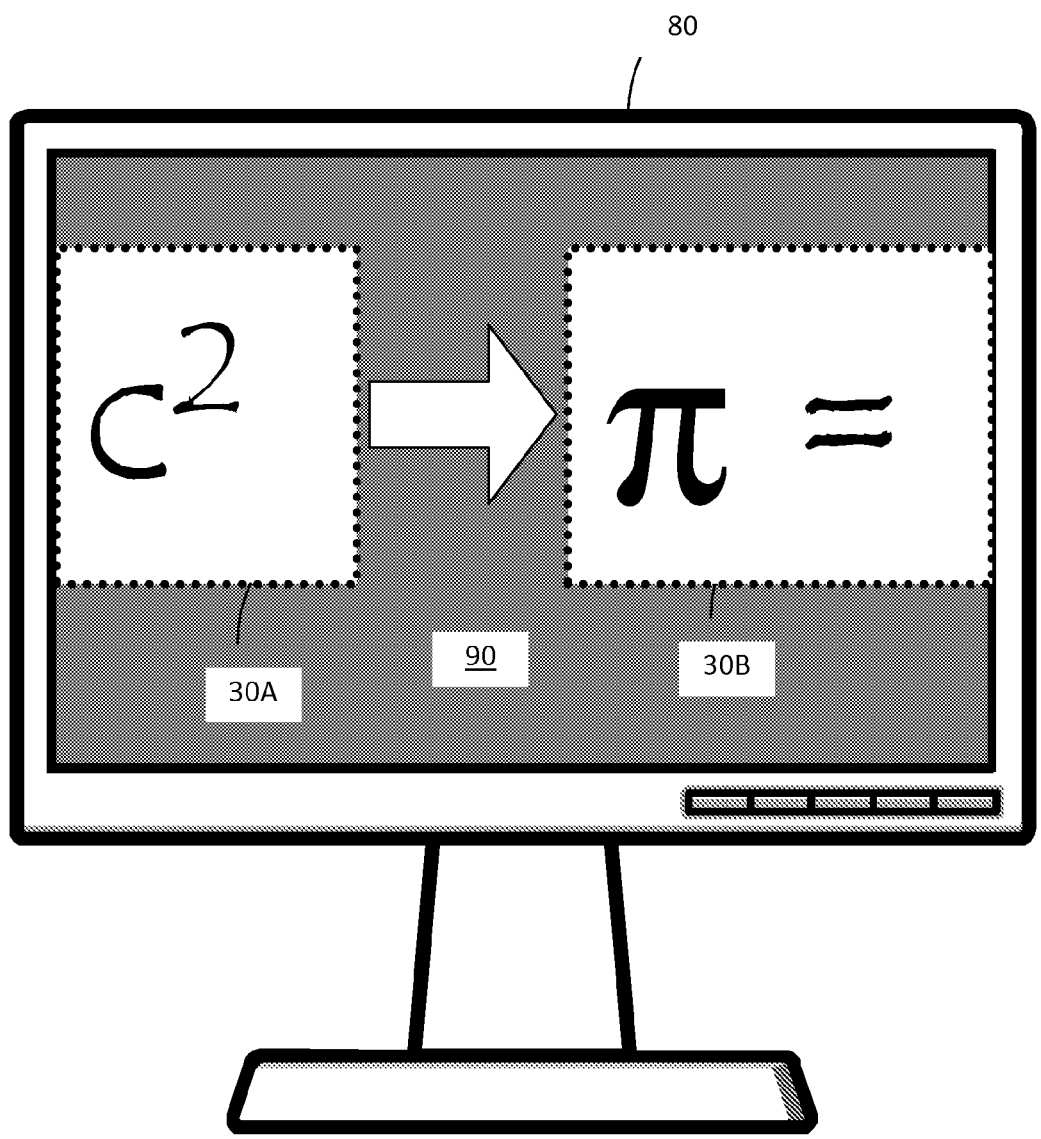
FIG. 9 is an illustration of a computer display showing an animated, left-to-right transition from the first formula to the second formula.
Figure 10:
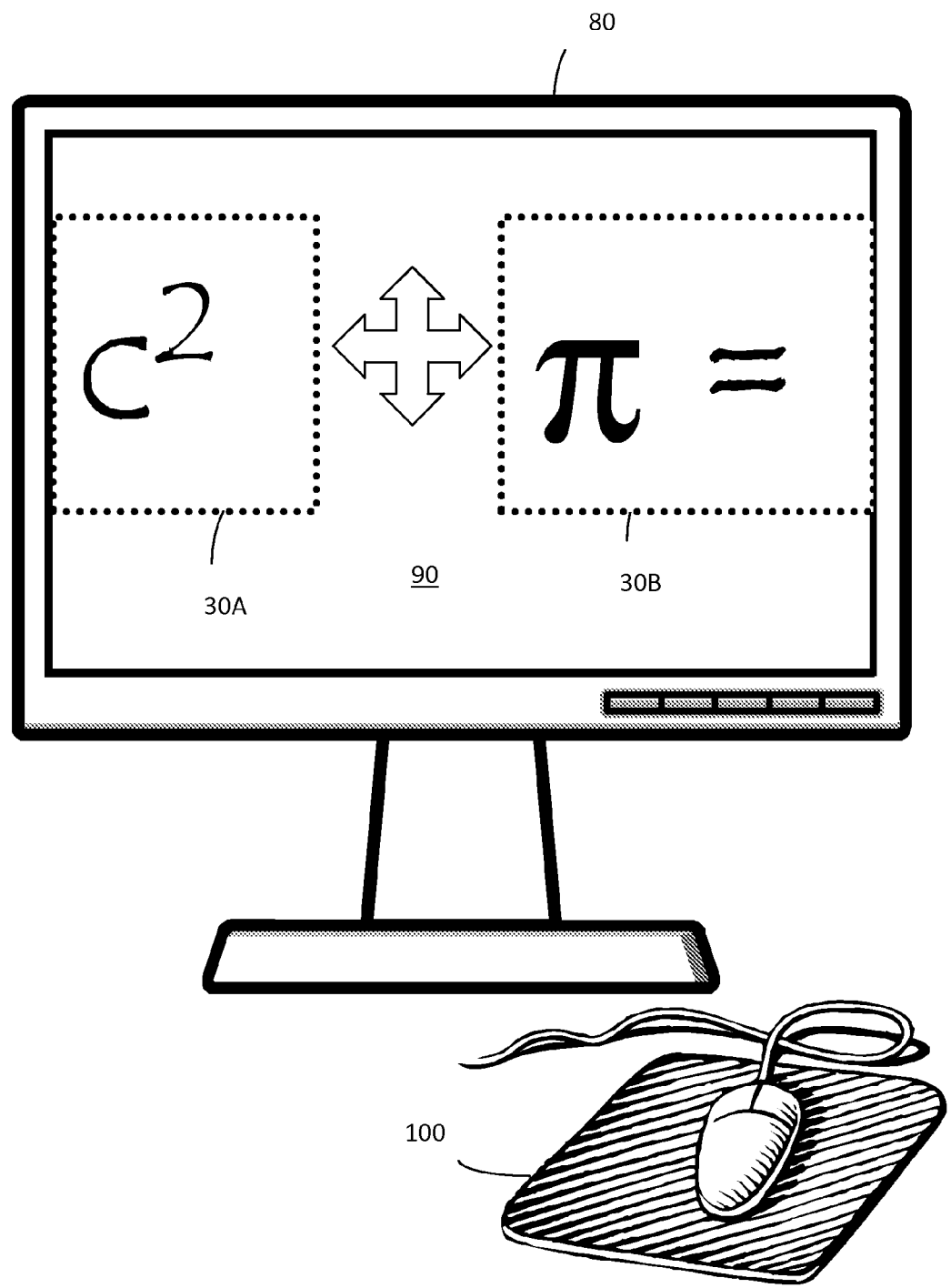
FIG. 10 is an illustration of both the first and second formulas displayed in spatial relation on a virtual scrollable canvas controllable by the end user's mouse peripheral.

Another feature of the present invention it is ability to maintain spatial relationships between regions of alterations. Cartesian coordinates are maintained in relation to whiteboard 10 as a whole. Therefore the relative position of formula 30A to formula 30B is accessible. In FIG. 9, as the presentation changes from the topic related to formula 30A to the topic related to formula 30B Cartesian coordinates instruct the invention to push the image of formula 30A to the left while bringing formula 30B into view from the right. This maintains consistency with the relative position that speaker 20 wrote the formulas on whiteboard 10.

In an embodiment of the invention, the entire whiteboard 10 is virtualized as a scrolling canvas of which only a portion is enlarged on desktop 90. End user manipulates mouse 100 on an X-Y axis to scroll about images recorded from whiteboard 10. The invention may continue to scroll towards the right from formula 30A to formula 30B. However, end user may manually scroll leftwards to formula 30A or in any direction as desired. As the display of formulas 30A-B are synchronized with audio of the presentation end user may manually alter the timecode value between transitions between formula 30A and formula 30B if desired.

Figure 11:
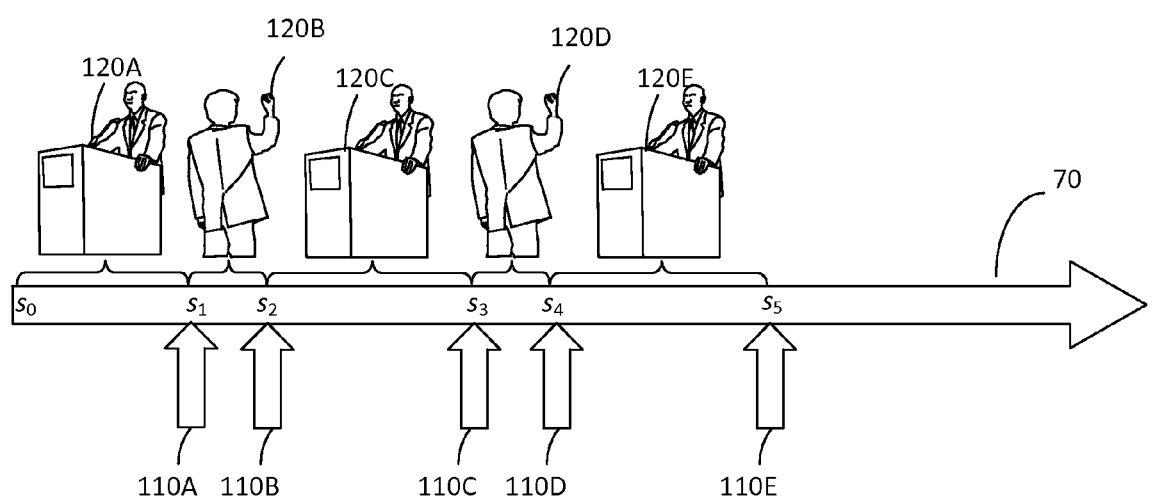
FIG. 11 is a diagrammatic illustration of a timeline comprising a plurality of segments representing both verbal lecture and writing on the whiteboard.

In FIG. 11, timeline 70 is segmented with markers 110A-E corresponding to timecodes $s_{1-5}$ respectively. The presentation is divided by speaker actions 120A-E. Actions 120A, 120C and 120E represent segments of time in which the speaker was talking. Actions 120B and 120D represent segments of time in which speaker was writing formulas 30A and 30B respectively. Accordingly, the time frame up to marker 110A may represent an "introduction." Markers 120A-B represent a transition to formula 30A. Markers 120B-C represent a discussion of formula 30A. Markers 120C-D represent a transition to formula 30B. Markers 120D-E represent a discussion of formula 30B.

Figure 12:
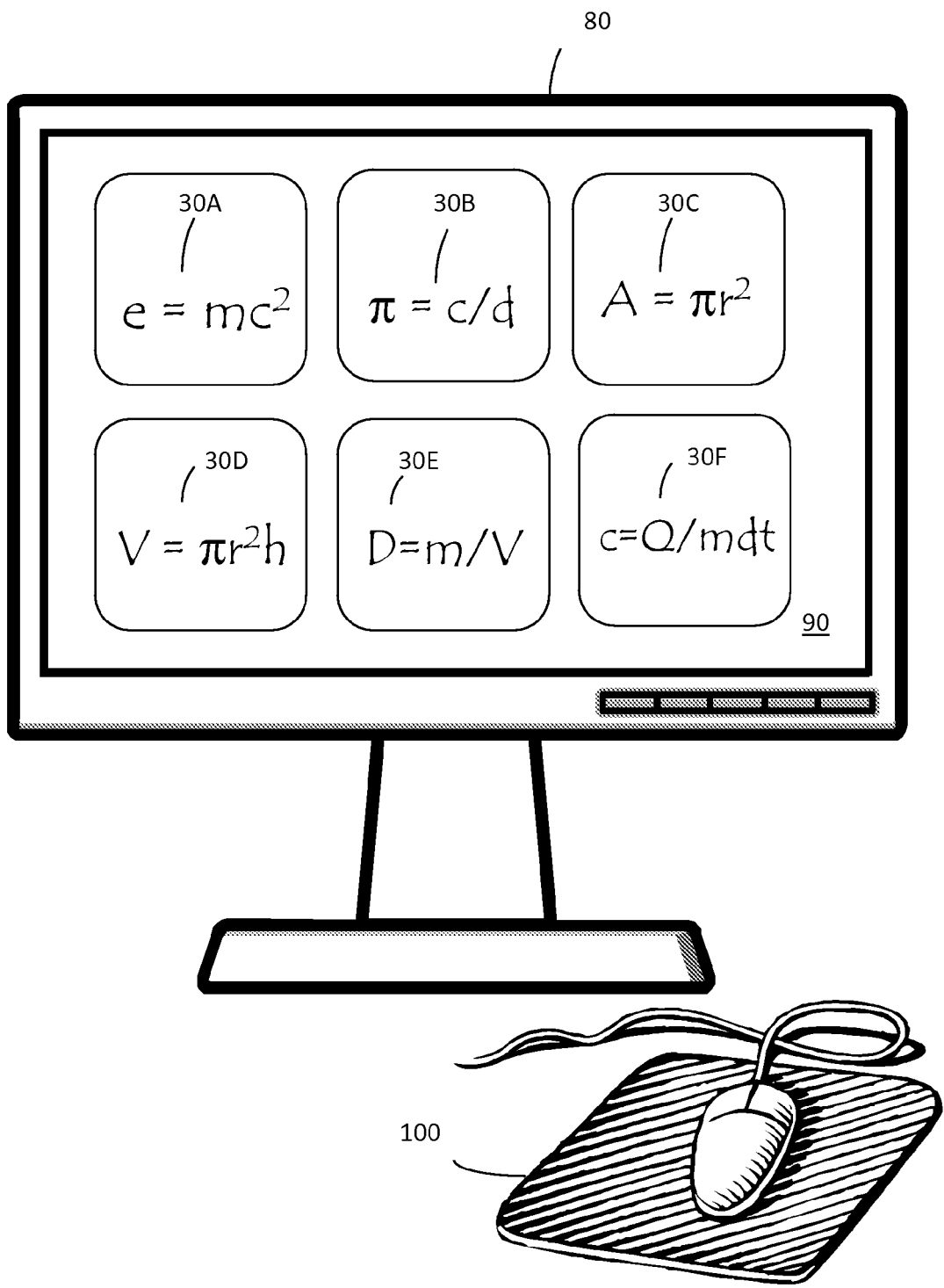
FIG. 12 is an illustration of an embodiment of the invention whereby thumbnail images of regions of alteration are displayed as end user-selectable chapters of the presentation.

In FIG. 12, frame regions defined by formulas 30A-F are presented as thumbnail images. End user selects thumbnail images to jump to that particular portion of the presentation.

Figure 13:
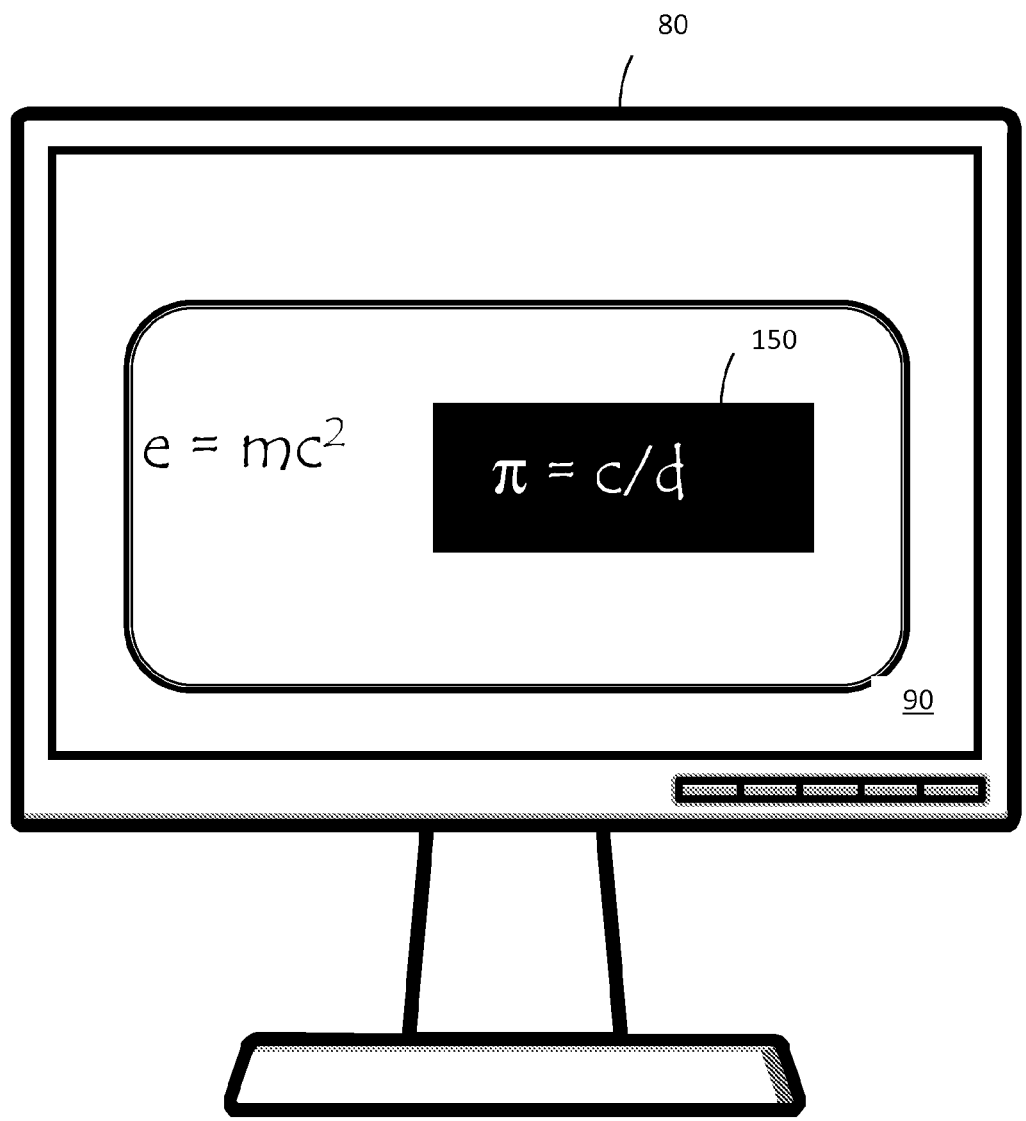
FIG. 13 is an illustration of an embodiment of the invention whereby a bounding box is superimposed over a region of alteration and an inverse contrast filter is applied to the area within the bounding box.

In FIG. 13, bounding box 150 is superimposed over formula 30B. The area inside bounding box 150 is graphically inverted to help contrast formula 30B to the end user.

Figure 14:
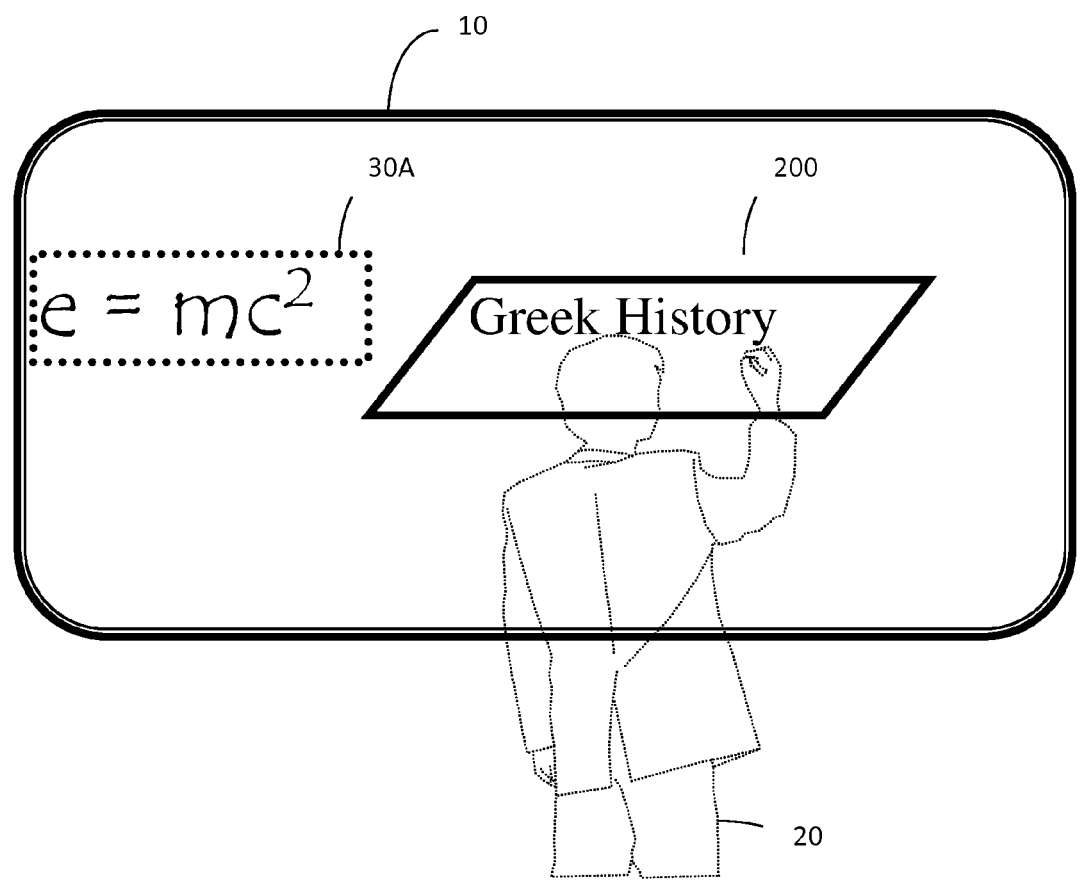
FIG. 14 is an illustration of an embodiment of the invention whereby an instructor designates a new topic of discussion by printing the topic within a predetermined geometric shape.

In FIG. 14, speaker 20 prints out topic "Greek History" inside predetermined geometric shape 200 (a parallelogram). Using edge-detection algorithms, computer-implemented process of the current invention is instructed to apply optical character recognition technology to any readable text within predetermined geometric shape 200. It is anticipated that a plurality of different geometric shapes may be preselected to instruct computer-implemented process to take different actions. It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

Figure 15A:
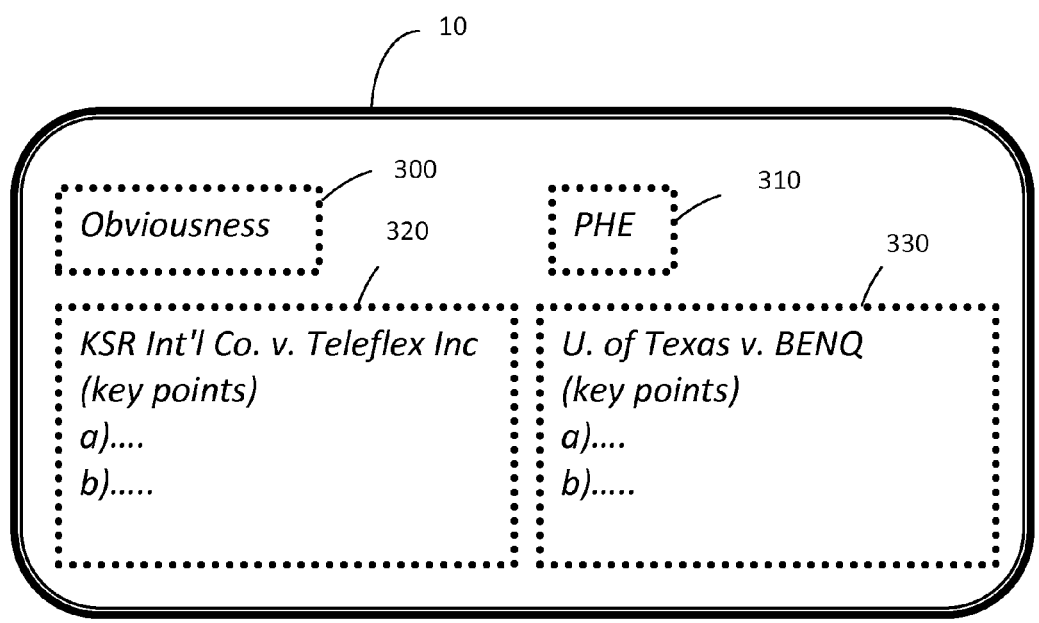
FIG. 15A is an illustration of a whiteboard having four (4) distinct regions of alterations.
Figure 15B:
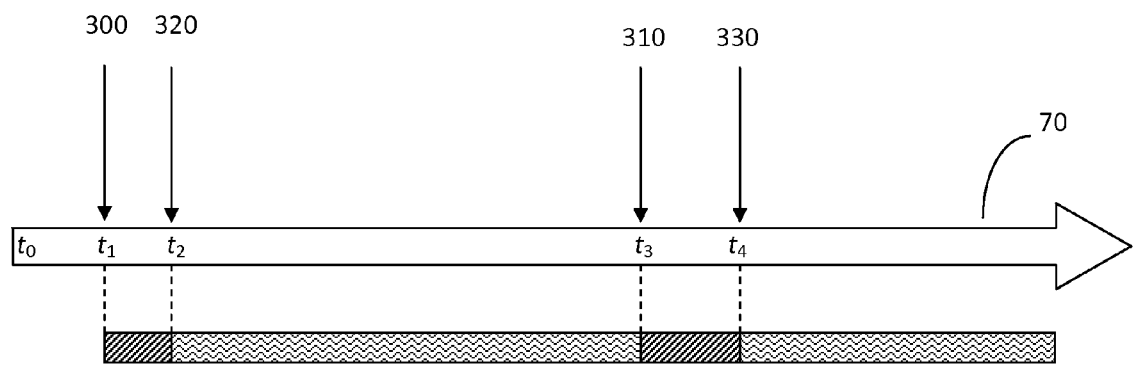
FIG. 15B is a diagrammatic illustration of a timeline noting the timecode values when each of the four distinct regions of alterations were made.

FIGS. 15A through 18 illustrate a useful and tangible transformation of data enabled by the present invention. In FIG. 15A, regions 300-330 are marked on whiteboard 10 according to the sequence enumerated in FIG. 15B. region 300 is entitled "Obviousness." Underneath region 300, region 320 discusses a case entitled "KSR Int'l Co. v. Teleflex Inc." To the right relative to region 300, region 310 is entitled "PHE" and underneath region 310, region 320 discusses a case entitled "U. of Texas v. BENQ." Standard OCR processes would have a difficult time figuring out the order of the text if whiteboard 10 is processes as a whole. Does region 310 follow region 300 in a left-to-right order? Alternatively, does region 320 follow region 300 in an up-to-down order with two columns?

Figure 16:
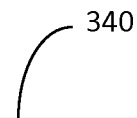
FIG. 16 is an illustration of OCR output to a document comprising the four distinct regions of alterations ordered according to timecode values.
Figure 16:
Figure 17A:
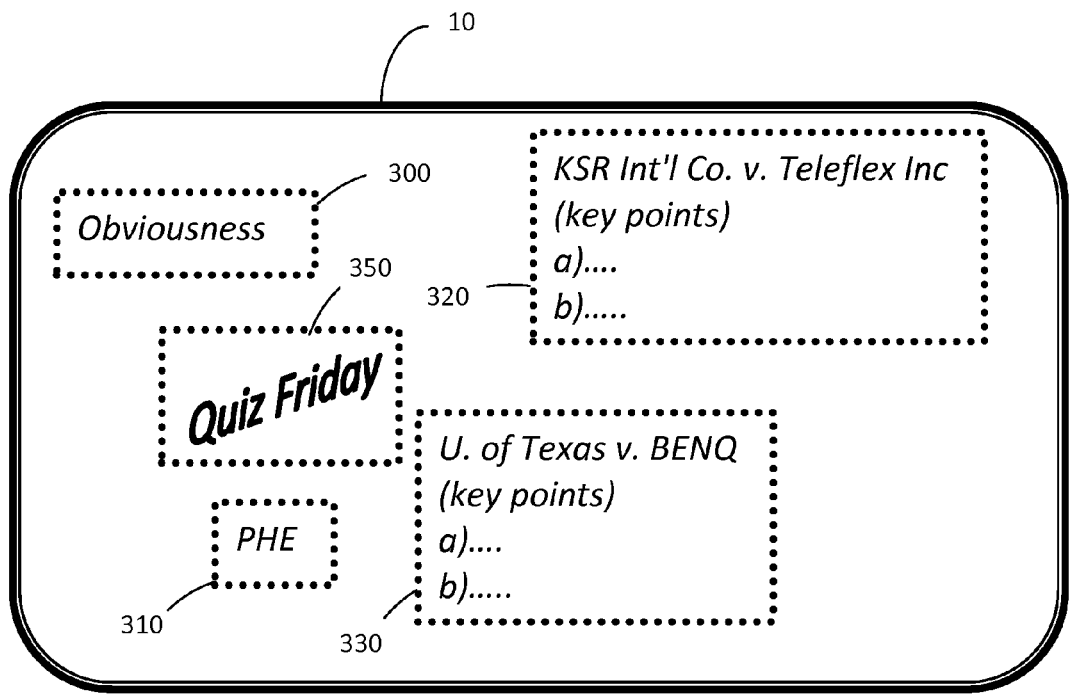
FIG. 17A is an illustration of a whiteboard having five (5) distinct regions of alterations.
Figure 17B:
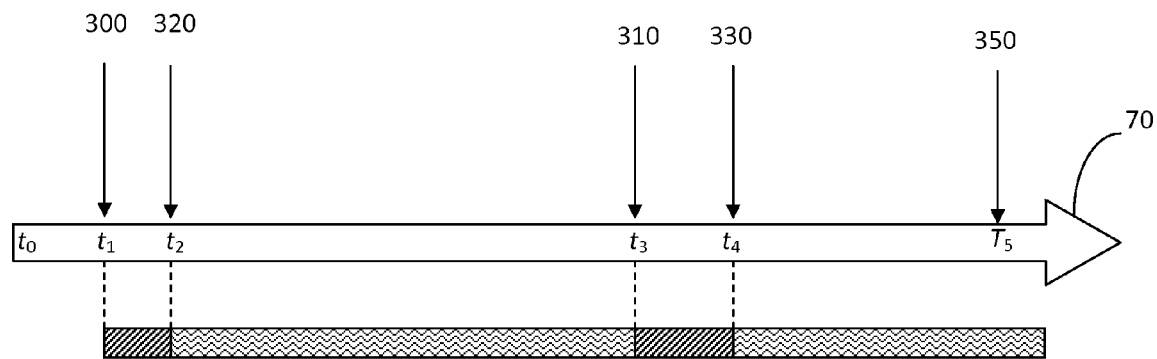
FIG. 17B is a diagrammatic illustration of a timeline noting the timecode values when each of the five distinct regions of alterations were made.
Figure 18:
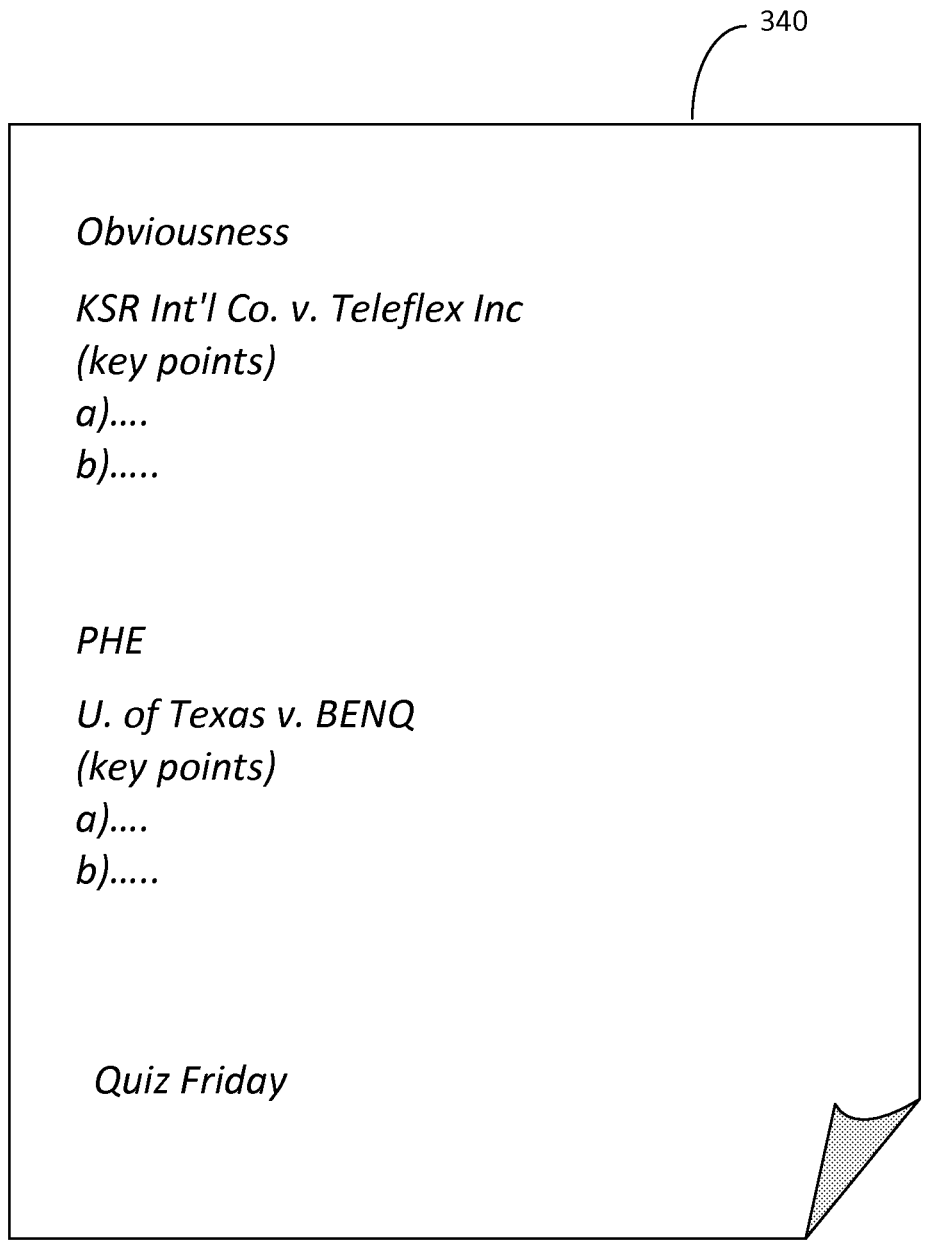
FIG. 18 is an illustration of OCR output to a document comprising the five distinct regions of alterations ordered according to timecode values.

By associating the time code value of each region, the sequence for assembling the OCR output is derived as shown in FIG. 16. For point of illustration, FIG. 17A reorients the locations of regions 300-330 and also inserts region 350. Again, by using the timecode values of each region as shown in FIG. 17B, the sequence of the OCR output is derived for assembling FIG. 18. Once the OCR output is correctly assembled, it may be output to any number of mediums including, but not limited to, electronic documents, speech and Braille.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A computer-implemented process comprising the steps of setting a digital imaging device to capture a preselected field of view, the field of view having a whiteboard subject to periodic change by a foreground speaker:

capturing a sequence of frames with the digital imaging device of the whiteboard and the foreground speaker writing on the whiteboard;

capturing audio linked with the captured sequence of frames;

establishing a first timecode value associated with the initiation of writing by the foreground speaker in a first region of the whiteboard, first region identified by applying an edge detection algorithm;

establishing a second timecode value associated with the initiation of writing by the foreground speaker in a second region of the whiteboard, the second region identified by applying an edge detection algorithm;

automatically broadcasting the captured audio and displaying the first region as magnified images from the sequence of frames from the first timecode value until the second timecode value; and automatically broadcasting the captured audio and displaying the second region as magnified images from the sequence of frames from the second timecode value.

2. A computer-implemented process comprising the steps of setting a digital imaging device to capture a preselected field of view, the field of view having a whiteboard subject to periodic change by a foreground speaker:

capturing audio linked with a captured sequence of frames;

establishing a first timecode value associated with the initiation of writing by the foreground speaker in a first region of the whiteboard, the first region identified by applying an edge detection algorithm;

establishing a second timecode value associated with the initiation of writing by the foreground speaker in a second region of the whiteboard, the second region identified by applying an edge detection algorithm;

automatically broadcasting the captured audio and displaying the first region of the whiteboard bounded by a first opaque mask overlaying the sequence of frames from the first timecode value until the second timecode value; and automatically broadcasting the captured audio and displaying the second region of the whiteboard bounded by a second opaque mask overlaying the sequence of frames from the second timecode value.

3. The method of claim 1 further comprising the steps of:

establishing the relative position of the first region to the second region;

sequentially displaying the first and second regions according to the timecode values; and automatically applying a visual transition associated with the relative position of the second region to the first region wherein the transition maintains an end user's spatial awareness of the whiteboard by automatically scrolling from the first magnified image to the second magnified image wherein the direction of the scrolling correlates to the relative position of the first and second regions and the timing of the scrolling correlates to the timecode values.

4. A computer-implemented process comprising the steps of:
- capturing audio linked with the captured sequence of frames;
- establishing a first timecode value associated with the initiation of writing by the foreground speaker in a first region of a whiteboard;
- establishing a second timecode value associated with the initiation of writing by the foreground speaker in a second region of the whiteboard;
- automatically broadcasting the captured audio and displaying the first region of the whiteboard with a first superimposed bounding box surrounding the first region of the whiteboard from the first timecode value until the second timecode value; and
- automatically broadcasting the captured audio and displaying the second region of the whiteboard with a second superimposed bounding box surrounding the second region of the whiteboard from the second timecode value.

5. The method of claim 4 further comprising the step of applying a graphic filter within the superimposed bounding box.

6. The method of claim 1 further comprising the step of identifying the initiation of writing by the foreground speaker in the first region responsive to a predetermined geometric shape drawn by the foreground speaker and detected by the digital imaging device, the predetermined geometric shape bounding the first region.

7. A computer-implemented process comprising the steps of:
- setting a digital imaging device to capture a preselected field of view, the field of view having a whiteboard subject to periodic change by a foreground speaker writing on the whiteboard;
- capturing a sequence of frames with the digital imaging device according to a preselected interval;
- identifying frames containing writing on the whiteboard;
- identifying the regions of the writing within the identified frames based on an elapsed, predetermined time period between a first set of writings by the foreground speaker and a subsequent set of writings by the foreground speaker wherein the elapsed time permits one region to be distinguished from another region;
- extracting the regions of whiteboard writings;
- associating a time code sequence with the extracted regions;
- applying OCR processing only to the extracted regions to produce OCR output arranged in a temporal order defined by elapsed, predetermine time periods between writings; and
- assembling the OCR output according to the time code sequence of the associated extracted regions.

8. The method of claim 7 further comprising the step of exporting the assembled OCR output to an electronic document.

9. The method of claim 7 further comprising the step of exporting the assembled OCR output to speech.

10. The method of claim 7 further comprising the step of exporting the assembled OCR output to Braille.

11. The method of claim 1 further comprising the steps of:
- detecting frames wherein the foreground speaker obstructs a view of writings in the first and second regions of the whiteboard; and
- filtering the foreground speaker from view in the magnified images by excluding frames wherein the foreground speaker obstructs the view.

12. The method of claim 2 further comprising the steps of:
- detecting frames wherein the foreground speaker obstructs a view of writings in the first and second regions of the whiteboard; and
- filtering the foreground speaker from view in the masked frames by excluding frames wherein the foreground speaker obstructs the view.

13. A computer-implemented process comprising the steps of setting a digital imaging device to capture a preselected field of view, the field of view having a background subject to periodic change:
- capturing a sequence of frames with the digital imaging device according to a preselected interval;
- capturing audio linked with the captured sequence of frames;
- establishing a first timecode value associated with the initiation of alterations in a first region of the background, the first region identified by applying an edge detection algorithm;
- establishing a second timecode value associated with the initiation of alterations in a second region of the background, the second region identified by applying an edge detection algorithm;
- establishing the relative position of the first region to the second region;
- sequentially displaying the first and second regions according to the timecode values;
- automatically broadcasting the captured audio and displaying the first region as magnified images from the sequence of frames from the first timecode value until the second timecode value;
- automatically broadcasting the captured audio and displaying the second region as magnified images from the sequence of frames from the second timecode value; and
- automatically applying a visual transition associated with the relative position of the second region to the first region wherein the transition maintains an end user's spatial awareness of the background by automatically scrolling from the first magnified image to the second magnified image wherein the direction of the scrolling correlates to the relative position of the first and second regions and the timing of the scrolling correlates to the timecode values.

* * * * *